Figures 1, 2:
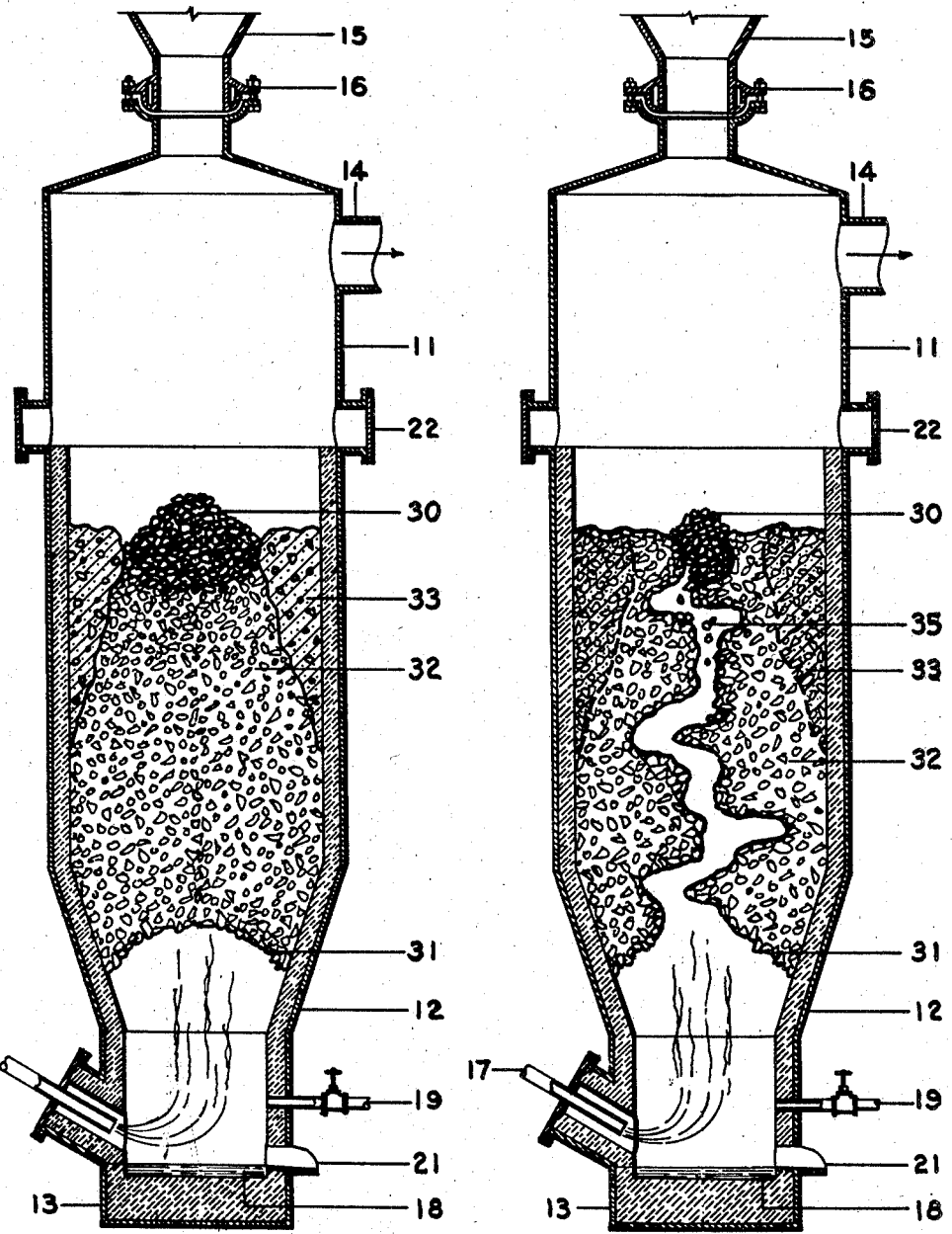

July 5, 1949. K. L. ELMORE 2,474,831

METHOD FOR DEFLUORINATING PHOSPHATE ROCK

Filed Nov. 28, 1947

Kelly L. Elmore INVENTOR.

BY Bentley A. Morrow

ATTORNEY.

PatentedJuly 5, 1949

2,474,831

UNITED STATES PATENT OFFICE 2,474,831

METHOD FOR DEFLUORINATING PHOSPHATE ROCK

Kelly L. Elmore, Sheffield, Ala., assignor to Tennessee Valley Authority, a corporation of the United States Application November 28, 1947, Serial No. 788,697

9 Claims. (Cl. 71—47)

(Granted under the act of March 3, 1883, as amended April 30, 1928; 370 O. G. 757)

The invention herein described may be manufactured and used by or for the Government for governmental purposes without the payment to me of any royalty thereon.

This invention relates to improvements in methods for defluorinating rock phosphate. In one particular aspect it relates to improvements in methods for securing intimate contact of molten rock phosphate and silica with water vapor, and in another particular aspect it relates to improvements in methods for melting rock phosphate with silica in a vertical shaft furnace. This application is a continuation-in-part of my copending application, Serial No. 580,265, filed February 28, 1945, entitled "Defluorinating rock phosphate," now abandoned.

The phosphate in raw phosphate rock has been shown to be in a chemical combination called fluorapatite, $Ca_{10}F_2(PO_4)_6$. This fluorapatite combination is well-known to be responsible for the low availability of the phosphate for plant food. Various methods for breaking up the fluorapatite structure have been employed, and these may be divided into two broad classes, namely, those which convert the fluorine of the fluorapatite group into simple fluorides, such as alkali fluorides, and leave the resulting fluorides in admixture the product of the process, and those which result in a product having very small or substantially no fluorine content. It is to this latter class that this invention relates.

It has been shown by Marshall et al., Ind. Eng. Chem. 27, 205–9 (1935), that fluorine can be volatilized from phosphate rock by heating the rock in the presence of silica and water vapor. The mechanism of this process presumably is that indicated in the following equation:

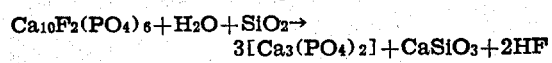
$$Ca_{10}F_2(PO_4)_6 + H_2O + SiO_2 \rightarrow 3[Ca_3(PO_4)_2] + CaSiO_3 + 2HF$$

They state that, from the point of view of the economics of production, methods for defluorinating phosphate rock by volatilizing fluorine in the presence of silica and water vapor are unsatisfactory. With low consumption of steam low output is obtained; with high consumption of steam these methods require so much heat as to be too expensive.

Rather complete removal of fluorine from rock phosphate has long been known to be necessary to convert the rock into fused tricalcium phosphate wherein the phosphate is in a form available for plant food. MacIntire et al., Soil Science 57, 423–44 (1944) have shown that for effective fertilizer use the florine content of defluorinated rock phosphate should not be greater than 0.4 per cent. Other investigators have found that fused tricalcium phosphate containing 0.6 per cent fluorine is an efficient fertilizer. The upper limit of fluorine permissible in phosphate fertilizer is therefore somewhat vague, but it should be as low as is practical to obtain, and should not exceed 0.6 per cent.

Attempts have been made to develop practical processes for the commercial application of the equation given above. U. S. Patent 2,220,575, issued November 5, 1940, has shown a method and apparatus for the defluorination of rock phosphate by this principle. It teaches melting the rock phosphate and silica in a chamber lined with silicon carbide, sintered corundum and chromite, or other very highly refractory and corrosion resistant material, followed by flowing a thin layer of the melt over the floor of an adjacent chamber of similar construction in intimate contact with a stream of hot gases containing water vapor. No commercial installations embodying these teachings are in operation because of the high cost of construction of furnaces necessary to carry out this type of operation, the unavoidable waste of heat through the furnace walls, operational difficulties in maintaining even flow of a sufficiently thin film of melt in contact with water vapor and hot gases, and excessive destruction of high-priced refractories by the extremely corrosive materials being handled. Phosphate fertilizer is a very cheap material and its selling price cannot support high manufacturing costs.

U. S. Patent 2,121,776, issued June 28, 1938, has shown a method for volatilizing fluorine from phosphate rock. In operating in this manner the rock is not melted, but the powdered rock is fed into the top of a vertical tower and drops down the tower in countercurrent to rising heated gases containing water vapor. This method is subject to operational difficulties. Accurate sizing and distribution of rock particles is necessary to obtain complete reaction and to prevent a large proportion of the product being blown out of the top of the tower with the waste gases. At the temperature of reaction (1400° C.) there is sintering and aggregation of the falling particles which makes it difficult to complete the reaction while the resulting aggregate is falling through the tower.

German Patent 699,313, issued November 27, 1940, describes a method of operation designed to overcome the difficulties inherent in the method of U. S. 2,121,776 by introducing heated gases tangentially so that they pass upward in a spiral and increase the time of contact of falling particles of rock with heated gases and water vapor. This method also requires expensive apparatus and is subject to operational difficulties.

Methods employing rotary and reverberatory furnaces have also been suggested. These have one or more of the disadvantages of requiring expensive equipment, resulting in incomplete defluorination and/or difficult operation.

Vertical shaft furnaces have long been known to be relatively cheap to construct and operate. The use of a vertical shaft furnace to carry out the defluorination of phosphate rock in the presence of silica and water vapor has been suggested but has heretofore been believed to be inoperable. British Patent 487,119, June 15, 1938, states that it is not possible to conduct defluorination of phosphate rock in such a furnace in continuous operation and teaches defluorination by melting the rock and silica and exposing the resulting molten material in a layer less than one inch thick to the action of hot gases and water vapor. This method also requires the use of very expensive, highly refractory and corrosion resistant linings and does not efficiently utilize the applied heat.

It is an object of this invention to provide a continuous process for the defluorination of phosphate rock which is operable in a vertical shaft furnace.

Another object is to provide such a process which may be carried out in cheap equipment.

Another object is to provide such a process wherein corrosion of equipment and heat losses through furnace walls are minimized.

A further object is to provide such a process wherein the fluorine content of a molten mixture of phosphate rock and silica may be reduced below 0.6 per cent by once traversing a defluorinating zone.

Still another object is to provide such a process which is cheap and convenient in operation and in which operational difficulties are minimized.

Other objects and advantages will become apparent from the following detailed description.

General Statement

I have now found that these objects may be attained by charging phosphate rock in admixture with silica in excess of the quantity required to satisfy the following equation:

$$Ca_{10}F_2(PO_4)_6 + H_2O + SiO_2 \rightarrow 3[Ca_3(PO_4)_2] + CaSiO_3 + 2HF$$

and preferably in the range from about 18 per cent to about 27 per cent of the total charge, into a vertical reaction zone in discrete lumps or masses; continuously directing a stream of hot combustion gases, containing water vapor in proportion not less than 4 per cent and preferably in the range from about 10 to about 20 per cent of the total combustion gases, substantially vertically upward against the bottom of the charge; passing the hot combustion gases upward through the central portion of the charge at a greater rate of flow than that through those portions of the charge adjacent to the walls of the vertical reaction zone, which is preferably a furnace constructed with a conventional arrangement of a vertical shaft surmounting a tapered bosh which in turn surmounts a hearth; withdrawing the resulting molten material, from which the greater proportion of fluorine has been volatilized, from a lower part of the reaction zone; and at intervals adding fresh portions of charge to the upper part of the mass of charge in the reaction zone.

It is best to concentrate the stream of hot gases to some extent at the more central part of the bottom of the charge. A furnace design which accomplishes this and is very efficient and convenient for carrying out this method or process is shown in the copending application of Hubbuch and Hignett, Serial No. 788,928, filed November 29, 1947, but no particular furnace design is embraced in the present invention, which may be carried out in various types of furnaces.

Drawings

The attached drawings show diagrammatically one type of furnace in which a method embodying my invention may be carried out. Fig. 1 shows diagrammatically one theory of furnace operation and Fig. 2 shows a second theory in outline. Like reference numerals apply to like parts in both figures.

Referring thereto, each figure shows a vertical shaft furnace which may be constructed as a steel shell having its lower part lined with ordinary commercial fire brick. The furnace comprises a vertical shaft 11 surmounting a tapered bosh 12 which in turn surmounts a hearth 13. The furnace is equipped with an outlet 14 for waste gases containing hydrogen fluoride, and with means for admitting fresh quantities of charge, illustrated as hopper 15 connected to the furnace top by universal joint 16.

Adjacent to the hearth of the furnace there is provided means for directing a stream of hot combustion gases substantially vertically upward through the central part of the furnace, illustrated as burner 17 adapted to blast a stream of burning hydrocarbon fuel and air at a location in the central portion of the hearth from whence the greatest portion of the heat is deflected substantially vertically upward from a pool of molten material 18 in the hearth.

If it is desired to use a fuel which is low in hydrogen, such as coal or coke, the furnace may also be equipped with a line 19 for admitting superheated steam. A means 21 for removing melt from the hearth 13 is provided also. Means 21 may conveniently be a conventional tap hole plugged with mud. Access doors 22 are disposed in the upper part of the furnace 11.

In the method of the present invention a furnace charge composed of discrete lumps or masses is used. These may preferably be sintered lumps, extruded pellets, briquettes or formed sticks, containing phosphate rock and silica, and which may easily be prepared by methods well known in the art; or they may be naturally occurring pebbles or lumps of phosphate rock and silica. For most convenient and efficient operation it is preferred that these lumps or masses be of approximately the same size, i. e., of as near the same size as can be obtained easily and cheaply by simple screening methods. It is also preferred that they have an average diameter of not less than one-fourth inch, because fuel requirements increase sharply as the masses decrease in size below one-fourth inch, while sand and similar fine materials are carried out of the furnace with waste gases and greatly increase the dust loss.

It is essential that the charge contain silica in admixture with phosphate rock in such proportions that the silica is in excess of the quantity required to satisfy the equation $$Ca_{10}F_2(PO_4)_6 + H_2O + SiO_2 \rightarrow$$
$$3[Ca_3(PO_4)_2] + CaSiO_3 + 2HF$$

and preferably the total silica present should be from about 18 per cent to about 27 per cent of the total charge.

Operation

It is preferable to begin operation of the method of the present invention by starting burner 17 and directing the greater part of the resulting hot combustion gases from burning hydrocarbon fuel substantially vertically upward through the more central part of the furnace shaft. This can be accomplished in a number of ways, such as by locating the burner at a selected angle, etc., but my invention does not embrace any particular design of furnace or burner.

The furnace is then rapidly filled with the charge described above until the upper surface of the charge is not less than ten feet and is preferably from about thirteen to about eighteen feet above the furnace hearth.

There should be sufficient concentration of hot combustion gases in the more central part of the furnace to result in passing the gases upward at a considerably greater rate of flow through the central parts of the charge than through those parts of the charge adjacent to the walls of the furnace.

The stream of hot combustion gases is passed upward through the charge continuously. After a period of time which varies with the charge and the conditions of operation, fire begins to show through a central part of the upper surface of the charge. When this occurs the central part of the upper surface of the charge appears, to an observer at an access door 22, to have sunk or fallen forming a crater. A fresh portion of charge 30 is then added to the upper central portion of the body of the charge in the furnace and the heating is continued with addition of fresh portions of charge whenever fire shows through the upper central surface of the charge and the central part of the charge appears to have sunk or fallen. At intervals molten, defluorinated tricalcium phosphate is withdrawn from the hearth of the furnace via tap hole 21.

I do not know the exact mechanism by which melting occurs in my process. Fig. 1 illustrates one theory which appears to be probable and which was suggested by a coworker operating an experimental furnace by this method. Fig. 1 shows a furnace which has theoretically been in operation by this method for some time. The lower part of the charge has melted to form a rough arch 31. Passing the hot gases up through the central part of the charge at greater rate of flow than through those parts of the charge adjacent to the walls of the furnace has resulted in the formation of a central portion of charge 32 in which the individual masses are melting. Since the heating has been less vigorous near the walls of the furnace, a ring of sintered rock 33 surrounds the upper part of the charge and adheres to the walls of the furnace. From time to time the melting rock in central portion 32 sinks or collapses to leave a sunken "chimney," shown filled with fresh portion of charge 30, surrounded by sintered ring 33.

Fig. 2 shows a second theory of melting, also suggested by a coworker. Here melting of the lower part of the charge has resulted in the formation of a rough arch 31 in the bosh of the furnace. This is surmounted by a central portion of slowly melting charge 32 which is surrounded at its upper part by a ring of sintered rock 33. Passing hot combustion gases upward through the central part of the charge at greater rate of flow than through those portions of the charge adjacent to the walls of the furnace has resulted in voids between individual masses in the central part of the charge becoming enlarged and communicating to form a tortuous "chimney" 35 extending from the top of arch 31 to the upper surface of the charge.

It is, of course, possible that neither of these theories is absolutely correct as no one can observe the interior of a charge of melting rock which in the operation of my method is at temperatures of the order of 1500° C. Observation from access doors 22 merely shows that during operation a crater or depression forms at a central upper part of the charge and that the flame often shoots up from the center of this crater rather like a volcano which is "blacked out" by charging fresh material. Investigations of furnaces which have cooled down show that there is sometimes present in the cooled mass of charge a tortuous "chimney," 35 extending from the upper surface to the bottom of the charge but that this "chimney" is more often merely a depression in the upper part of the charge, as is shown in Fig. 1, surrounded by a raised rim of sintered charge 33.

However, it is certain that an arch 31 is formed, and that the greater proportion of melting occurs on the surface of arch 31 and in that part of the charge extending vertically upward through the central part of the furnace.

A charge having the composition described above has been found to have certain unexpected properties which make this process operable. The individual masses sinter or adhere to the furnace walls and to each other with sufficient strength to form an arch in the bosh and to prevent the melting charge from collapsing into the hearth of the furnace. The individual masses melt on their surfaces exposed to the stream of hot combustion gases without softening in their interiors sufficiently to permit the mass of charge to settle under its own weight and to close off passages for gases through the body of the charge.

As a result of these properties, hot gases flowing upward through voids in the body of the charge come into intimate contact with surfaces of individual masses. Melting occurs on these surfaces and the resulting molten material trickles down over lower portions of the charge in intimate countercurrent contact with hot gases containing water vapor and is effectively defluorinated.

The molten material need descend only a few feet in contact with the gas stream for the greater part of its fluorine content to be transformed into volatile compounds and to be vaporized from the melt. While I prefer to use a body of charge having a depth of at least ten feet and more preferably from thirteen to eighteen feet or more, this preference is based upon economies of heat transfer. If hot gases flow through a thin layer of charge they emerge at very high temperature and so much heat is lost in overhead gases as to greatly increase the expense of the process.

The molten material withdrawn from the hearth of the furnace is impure tricalcium phosphate in which the fluorine content may consistently be well below 0.6 per cent, and may often be as low as from 0.2 to 0.3 per cent.

In the operation of my process it is well to maintain the water vapor content of the hot combustion gases at not less than 4 per cent and preferably in the range from 10 to 20 per cent. The latter range corresponds roughly to the water content of gases resulting from burning fuel oil or natural gas. When fuels low in hydrogen, such as coal or coke, are used, it is desirable to introduce sufficient superheated steam to increase the water content of the combustion gases to about 4 per cent or more. A water content exceeding 20 per cent is not detrimental to the operation of the process, but is unnecessary, and, since to maintain a higher concentration would necessitate the introduction of unnecessary steam or the use of a fuel which burns to form a higher proportion of water than does natural gas, it is uneconomical.

When it is desired to prepare a product having sufficiently low fluorine content to be suitable for animal feeding, i. e., less than 0.1 per cent F., this may be done by withdrawing the molten product from the hearth of the furnace, cooling it and forming it into discrete lumps or masses as described above, charging these into a furnace and repeating the above described process. The second treatment of the material by this process reduces the fluorine content to the desired degree.

*Example I*

A furnace was operated as described, employing a briquetted charge of phosphate rock and silica in which the silica content was between 18 and 25 per cent. A fuel oil burner was used and was set at an angle to result in the greater portion of the hot gases being deflected substantially vertically upward from the surface of molten material accumulating in the hearth of the furnace. The water content of the combustion gases was about 12 per cent.

After operating the furnace for many hours in each run, the furnace filled with charge was allowed to cool and samples of the solidified charge were collected from various heights above the hearth and were analyzed for fluorine content. The results were as follows.

| Run No. | Height above Hearth | Percent Fluorine |
|---|---|---|
| 1 | 17' 2½" (original charge) | 2.70 |
|   | 10' | 0.96 |
|   | 7' 6" | 0.26 |
|   | Product | 0.16 |
| 2 | 17' 2½" (original charge) | 2.63 |
|   | 15' | 1.62 |
|   | 12' 6" | 0.21 |
|   | Product | 0.17 |

*Example II*

A product containing 0.40 per cent fluorine was produced by operating as in Example I. This product was withdrawn, cooled and formed into lumps or masses. These were charged into a furnace and a series of operations similar to those of Example I followed. The results were:

| Height above Hearth | Per Cent Fluorine |
|---|---|
| 17' 2½" | 0.40 |
| 12' | 0.31 |
| 9' | 0.29 |
| Product | 0.02 |

I claim:

1. A process for defluorinating phosphate rock which comprises introducing a charge consisting of phosphate rock and naturally occurring siliceous material, in which the proportion of silica is in excess of that required to satisfy the equation $$Ca_{10}F_2(PO_4)_6 + H_2O + SiO_2 \rightarrow 3[Ca_3(PO_4)_2] + CaSiO_3 + 2HF$$

into a vertical reaction zone in discrete masses; continuously directing a stream of hot combustion gases, containing not less than 4 per cent of water vapor, substantially vertically upward against the bottom of the charge; passing the hot combustion gases upward through the central parts of the charge at a substantially greater rate of flow than the rate of flow of said gases through those parts of the charge adjacent to the walls of the reaction zone so that the upper portion of the charge forms a sintered ring surrounding a central melting zone; withdrawing the resulting molten material, from which the greater proportion of fluorine has been volatilized, from a lower part of the reaction zone; and at intervals adding fresh portions of charge to the upper part of the body of charge in the reaction zone.

2. A process for defluorinating phosphate rock which comprises introducing a charge consisting of phosphate rock and naturally occurring siliceous material, in which the proportion of silica is from about 18 per cent to about 27 per cent, into a vertical reaction zone in discrete masses; continuously directing a stream of hot combustion gases, containing not less than 4 per cent of water vapor, substantially vertically upward against the bottom of the charge; passing the hot combustion gases upward through the central parts of the charge at a substantially greater rate of flow than the rate of flow of said gases through those parts of the charge adjacent to the walls of the reaction zone so that the upper portion of the charge forms a sintered ring surrounding a central melting zone; withdrawing the resulting molten material, from which the greater proportion of fluorine has been volatilized, from a lower part of the reaction zone; and at intervals adding fresh portions of charge to the upper part of the body of charge in the reaction zone.

3. A process for defluorinating phosphate rock which comprises introducing a charge consisting of phosphate rock and naturally occurring siliceous material, in which the proportion of silica is from about 18 per cent to about 27 per cent, into a vertical reaction zone in discrete masses; continuously directing a stream of hot combustion gases, containing from 10 to 20 per cent of water vapor, substantially vertically upward against the bottom of the charge; passing the hot combustion gases upward through the central parts of the charge at a substantially greater rate of flow than the rate of flow of said gases through those parts of the charge adjacent to the walls of the reaction zone so that the upper portion of the charge forms a sintered ring surrounding a central melting zone; withdrawing the resulting molten material, from which the greater proportion of fluorine has been volatilized, from a lower part of the reaction zone; and at intervals adding fresh portions of charge to the upper part of the body of charge in the reaction zone.

4. In a process for defluorinating phosphate rock wherein phosphate rock in admixture with silica is melted in a furnace, the resulting molten material is exposed to intimate contact with hot gases containing water vapor and the greater proportion of fluorine contained in the phosphate rock is volatilized from the melt, that improvement which comprises introducing a charge consisting of phosphate rock containing naturally occurring siliceous material, in which the proportion of silica is from about 18 to about 27 per cent, into a vertical shaft furnace in discrete masses having an average diameter of not less than one-fourth inch; continuously directing a stream of hot combustion gases, containing not less than about 4 per cent of water vapor, substantially vertically upward against the bottom of the charge; passing the hot combustion gases upward through the central parts of the charge at a substantially greater rate of flow than the rate of flow of said gases through the parts of the charge adjacent to the walls of said furnace so that the upper portion of the charge forms a sintered ring surrounding a central melting zone; collecting the resulting molten material after it has trickled down over unmelted portions of the charge in intimate contact with said combustion gases in a lower part of the furnace; at intervals removing said molten material from the furnace; and at intervals adding fresh portions of charge to the upper part of the body of the charge.

5. In a process for defluorinating phosphate rock wherein phosphate rock in admixture with silica is melted in a furnace, the resulting molten material is exposed to intimate contact with hot gases containing water vapor and the greater proportion of fluorine contained in the phosphate rock is volatilized from the melt, that improvement which comprises introducing a charge consisting of phosphate rock containing naturally occurring siliceous material, in which the proportion of silica is from about 18 to about 27 per cent, into a vertical shaft furnace in discrete masses having an average diameter of not less than one-fourth inch until the furnace is filled to a depth of not less than 10 feet; continuously directing a stream of hot combustion gases, containing from about 10 per cent to about 20 per cent of water vapor, substantially vertically upward against the bottom of the charge; passing the hot combustion gases upward through the central parts of the charge at a substantially greater rate of flow than the rate of flow of said gases through the parts of the charge adjacent to the walls of said furnace so that the upper portion of the charge forms a sintered ring surrounding a central melting zone; collecting the resulting molten material after it has trickled down over unmelted portions of the charge in intimate contact with said combustion gases in a lower part of the furnace; at intervals removing said molten material from the furnace; and at intervals adding fresh portions of charge to the upper part of the body of the charge.

6. In a process for defluorinating phosphate rock wherein phosphate rock in admixture with silica is melted in a furnace, the resulting molten material is exposed to intimate contact with hot gases containing water vapor and the greater proportion of fluorine contained in the phosphate rock is volatilized from the melt, that improvement which comprises introducing a charge consisting of phosphate rock containing naturally occurring siliceous material, in which the proportion of silica is from about 18 to about 27 per cent, into a vertical shaft furnace in discrete masses of approximately equal size having an average diameter of not less than one-fourth inch; continuously directing a stream of hot combustion gases, containing not less than about 4 per cent of water vapor, substantially vertically upward against the bottom of the charge; passing the hot combustion gases upward through the central parts of the charge at a substantially greater rate of flow than the rate of flow of said gases through the parts of the charge adjacent to the walls of said furnace so that the upper portion of the charge forms a sintered ring surrounding a central melting zone; collecting the resulting molten material after it has trickled down over unmelted portions of the charge in intimate contact with said combustion gases in a lower part of the furnace; at intervals removing said molten material from the furnace; and at intervals adding fresh portions of charge to the upper part of the body of the charge.

7. In a process for defluorinating phosphate rock wherein phosphate rock in admixture with silica is melted in a furnace, the resulting molten material is exposed to intimate contact with hot gases containing water vapor and the greater proportion of fluorine contained in the phosphate rock is volatilized from the melt, that improvement which comprises introducing a charge consisting of phosphate rock containing naturally occurring siliceous material, in which the proportion of silica is from about 18 to about 27 per cent, into a vertical shaft furnace in discrete masses of approximately equal size having an average diameter of not less than one-fourth inch until the furnace is filled to a depth of not less than 10 feet; continuously directing a stream of hot combustion gases, containing from 10 to 20 per cent of water vapor, substantially vertically upward against the bottom of the charge; passing the hot combustion gases upward through the central parts of the charge at a substantially greater rate of flow than the rate of flow of said gases through the parts of the charge adjacent to the walls of said furnace so that the upper portion of the charge forms a sintered ring surrounding a central melting zone; collecting the resulting molten material after it has trickled down over unmelted portions of the charge in intimate contact with said combustion gases in a lower part of the furnace; at intervals removing said molten material from the furnace; and at intervals adding fresh portions of charge to an upper central part of the body of the charge.

8. In a process for defluorinating phosphate rock according to the equation

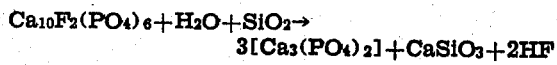

$$Ca_{10}F_2(PO_4)_6 + H_2O + SiO_2 \rightarrow 3[Ca_3(PO_4)_2] + CaSiO_3 + 2HF$$

wherein phosphate rock in admixture with silica is melted in a furnace and is exposed to contact with hot gases containing water vapor, that improvement which comprises introducing a charge consisting of phosphate rock and naturally occurring siliceous material, in which the proportion of silica is from about 18 per cent to about 27 per cent, into a vertical shaft furnace in discrete masses and in quantity sufficient to fill the furnace to a depth of not less than about 10 feet; continuously directing a stream of hot combustion gases containing from about 10 per cent to about 20 per cent of water vapor substantialy vertically upward against the bottom of the charge, passing said hot gases upward through the central portion of the charge at substantially greater rate of flow than through those portions of the charge adjacent to the walls of the furnace so that the upper portion of the charge forms a sintered ring surrounding a central melting zone; slowly melting masses of charge in said central portions; collecting the resulting molten material in a lower portion of the furnace after it has trickled down over unmelted portions of the charge in intimate contact with said hot gases containing water vapor; and at intervals removing the resulting molten mixture, comprising tricalcium phosphate and calcium silicate containing not more than 0.6 per cent fluorine, from the furnace.

9. A process for preparing tricalcium phosphate suitable for animal feeding which comprises charging discrete masses, of approximately equal size and having an average diameter of not less than about one-fourth inch consisting of phosphate rock and naturally occurring siliceous material in such proportions that there is from about 18 per cent to about 27 per cent of silica present, into a vertical reaction zone until the reaction zone is filled to a depth of not less than about 10 feet; continuously directing a stream of hot combustion gases, containing not less than about 4 per cent of water vapor, substantially vertically upward against the bottom of the charge; passing the hot combustion gases upward through the central parts of the charge at a substantially greater rate of flow than through the parts of the charge adjacent to the walls of said reaction zone so that the upper portion of the charge forms a sintered ring surrounding a central melting zone; at intervals adding fresh portions of charge to the upper central part of the body of charge in the reaction zone; collecting the resulting molten material in a lower part of the reaction zone after said material has trickled down over unmelted portions of the charge in intimate contact with said hot combustion gases; removing said molten material from said lower part of the reaction zone; cooling the removed molten material and forming it into solid masses of approximately equal size and having an average diameter of not less than about one-fourth inch; charging the resulting masses into a second vertical reaction zone until said second reaction zone is filled to a depth of not less than about ten feet; repeating the process described above; and removing impure tricalcium phosphate containing less than 0.1 per cent fluorine from a lower part of said second reaction zone.

KELLY L. ELMORE.

REFERENCES CITED

The following references are of record in the file of this patent:

UNITED STATES PATENTS

| Number | Name | Date |
|---|---|---|
| 1,411,696 | Haege | Apr. 4, 1922 |
| 1,803,417 | Walton | May 5, 1931 |
| 2,093,176 | Tromel | Sept. 14, 1937 |
| 2,189,248 | Luscher | Feb. 6, 1940 |
| 2,220,575 | Luscher | Nov. 5, 1940 |
| 2,395,231 | McNeil | Feb. 19, 1946 |

FOREIGN PATENTS

| Number | Country | Date |
|---|---|---|
| 487,265 | Great Britain | June 17, 1938 |

OTHER REFERENCES

Elmore et al., Defluorination of Phosphate Rock in the Molten State, Ind. & Engr. Chem., vol. 34, No. 1 (1942), pages 40–48.